United States Patent
Lin

(10) Patent No.: US 9,156,962 B2
(45) Date of Patent: Oct. 13, 2015

(54) MATERIAL COMPOSITION WITH SPECIFIC SEGMENT WAVELENGTH MATCHING REFRACTIVE INDEX

(75) Inventor: Tien-Tsai Lin, Taipei (TW)

(73) Assignees: S.A.W. Green Technology Corp., New Taipei (TW); Tien-Tsai Lin, Taipei (TW)

(*) Notice: Subject to any disclaimer, the term of this patent is extended or adjusted under 35 U.S.C. 154(b) by 1093 days.

(21) Appl. No.: 13/210,390

(22) Filed: Aug. 16, 2011

(65) Prior Publication Data

US 2013/0043431 A1 Feb. 21, 2013

(51) Int. Cl.
  *C09K 11/02* (2006.01)
  *C08K 3/22* (2006.01)
  *C08L 63/00* (2006.01)
  *B82Y 20/00* (2011.01)
  *B82Y 30/00* (2011.01)

(52) U.S. Cl.
  CPC . *C08K 3/22* (2013.01); *B82Y 20/00* (2013.01); *C08L 63/00* (2013.01); *C09K 11/02* (2013.01); *B82Y 30/00* (2013.01)

(58) Field of Classification Search
  USPC .......... 257/99, 100, 79, 103; 252/301.36; 977/779; 523/458
  See application file for complete search history.

(56) References Cited

U.S. PATENT DOCUMENTS 7,217,959 B2 * 5/2007 Chen .................. 257/100
2004/0084686 A1 * 5/2004 Wang et al. .............. 257/99

FOREIGN PATENT DOCUMENTS

JP 2007-327990 * 12/2007

* cited by examiner

*Primary Examiner* — Monique Peets
(74) *Attorney, Agent, or Firm* — Leong C. Lei

(57) ABSTRACT

A material composition with specific segment wavelength matching refractive index includes (a) resin or a composite thereof to serve as a bonding agent and (b) a medium material of metal oxides or complex metal oxides of specific particle size to serve as an additive for specific segment wavelength matching refractive index. The composition is formed by combining the bonding agent and additive. The composition material uses the wavelength of light emitting from a light-emitting diode (LED) die or excited from a fluorescent agent as the range of a segment to add nanometer particles of $D=\lambda/4n$ optic thickness as basis for formation of an effective medium layer and thus providing a matching refractive index for wavelength of the specific segment bandwidth. Corresponding to different refractive indexes $n_x$ of LED die materials, proper amounts of nanometer particles are selectively added to have the refractive index match the LED die.

23 Claims, 12 Drawing Sheets

| | particle size distribution | Wavelength segment characteristics | amount of nanometer particle added | viscosity of resin | criterion for selection of particle size | selectivity of product |
|---|---|---|---|---|---|---|
| present invention | peak ≒ D=λ/4n | refractivity changed in specific wavelength segment | small amount added | slightly increasing viscosity low | D=λ/4n optic thickness | excellent requirement for multiple segment wavelength |
| prior art | ≤1×10⁻⁸m | not possible to design specific wavelength for change of refractivity | large amount added | greatly increasing viscosity | a/λ<0.1 Rayleigh Scattering Geometric thickness | not possible to design for specific segment |

FIG.5

| light emission material layer | Light emission material layer refractive index | substrate material | substrate material refractive index | color | light wavelength |
|---|---|---|---|---|---|
| GaP(N) | 3.42 | GaP | 3.42 | GREEN | 565 |
| GaP | 3.44 | GaP | 3.44 | PURE GREEN | 555 |
| In(GaAl)P | 3.52 | GaAs | 3.99 | GREEN | 573 |
| GaN | 2.44 | Al$_2$O$_3$ | 1.78 | BLUE | 490 |
| GaN | 2.51 | Al$_2$O$_3$ | 1.78 | BLUE | 430 |
| SiC | ~2.69 | SiC | 2.69 | BLUE | 480(490) |
| ZnSe | ~2.66 | ZnSe | 2.66 | BLUE | 480(550) |
| ZnS | 2.65 | ZnS | 2.65 | BLUE | 460 |
| GaAs(Si) | 3.55 | GaAs | 3.55 | IR | 940 |
| GaAs(Zn) | 3.6 | GaAs | 3.6 | IR | 900 |
| GaAlAs(Si) | 3.62 | GaAs | 3.62 | IR | 880 |
| Ga$_{0.97}$Al$_{0.03}$As(Ga$_{0.90}$Al$_{0.10}$As) | 3.56 | GaAs | 3.65 | IR | 850 |

FIG.6

Data source: Lighting Research Center, Rensselaer Polytechnic Institute, USA

| | epoxy resin wt % | ZrO$_2$ 55.65 nm wt % | SiO$_2$ (97.6 nm) wt % | reflectivity (450 nm) % | reflectivity (570 nm) % | reflectivity (450 nm) % | reflectivity (570 nm) % |
|---|---|---|---|---|---|---|---|
| example 1 | 98.75 | 1.25 | | 5.3 | | 1.6 | |
| example 2 | 98.75 fluorescent agent 8% | 1.25 | 0.5 | 5.3 | | 1.6 | 1.35 |

FIG.8

| wavelength (nm) | reflectivity (%) | wavelength (nm) | reflectivity (%) | wavelength (nm) | reflectivity (%) | wavelength (nm) | reflectivity (%) | wavelength (nm) | reflectivity (%) |
|---|---|---|---|---|---|---|---|---|---|
| 310 | 4.97 | 410 | 7.59 | 510 | 7.07 | 610 | 5.76 | 710 | 5.27 |
| 320 | 4.95 | 420 | 7.82 | 520 | 6.91 | 620 | 5.69 | 720 | 5.25 |
| 330 | 5.99 | 430 | 7.98 | 530 | 6.75 | 630 | 5.62 | 730 | 5.23 |
| 340 | 6.82 | 440 | 8.02 | 540 | 6.60 | 640 | 5.56 | 740 | 5.21 |
| 350 | 7.00 | 450 | 7.98 | 550 | 6.44 | 650 | 5.50 | 750 | 5.20 |
| 360 | 7.15 | 460 | 7.87 | 560 | 6.30 | 660 | 5.44 | 760 | 5.18 |
| 370 | 7.23 | 470 | 7.73 | 570 | 6.18 | 670 | 5.36 | 770 | 5.18 |
| 380 | 7.28 | 480 | 7.58 | 580 | 6.05 | 680 | 5.33 | 780 | 5.16 |
| 390 | 7.31 | 490 | 7.41 | 590 | 5.95 | 690 | 5.32 | 790 | 5.16 |
| 400 | 7.41 | 500 | 7.24 | 600 | 5.85 | 700 | 5.30 | 800 | 5.14 |

| wavelength (nm) | reflectivity (%) | wavelength (nm) | reflectivity (%) | wavelength (nm) | reflectivity (%) |
|---|---|---|---|---|---|
| 410 | 4.79 | 510 | 6.96 | 610 | 7.07 |
| 420 | 4.92 | 520 | 7.17 | 620 | 6.78 |
| 430 | 5.13 | 530 | 7.35 | 630 | 6.47 |
| 440 | 5.36 | 540 | 7.52 | 640 | 6.18 |
| 450 | 5.59 | 550 | 7.65 | 650 | 5.89 |
| 460 | 5.81 | 560 | 7.76 | 660 | 5.62 |
| 470 | 6.03 | 570 | 7.80 | 670 | 5.36 |
| 480 | 6.26 | 580 | 7.68 | 680 | 5.11 |
| 490 | 6.50 | 590 | 7.51 | 690 | 4.88 |
| 500 | 6.75 | 600 | 7.31 | 700 | 4.67 |

MATERIAL COMPOSITION WITH SPECIFIC SEGMENT WAVELENGTH MATCHING REFRACTIVE INDEX

(a) TECHNICAL FIELD OF THE INVENTION

The present invention generally relates to a packaging material composition with specific segment wavelength matching refractive index, wherein nanometer particles of metal oxides having a size of specific D=λ/4n optic thickness are used as an additive, which is then mixed with resin of bonding agent to form a material composition with specific segment wavelength matching refractive index.

The present invention relates to a material with specific segment wavelength matching refractive index, which uses the wavelength of the light emitting from an LED as the range of specific segment, whereby the refractive index of die material being $n_x$ and the refractive index of packaging material composition having a value=$vn_x$ are used to provide refractive index matching of diode to realize specific segment wavelength matching refractive index.

The present invention relates to a packaging material composition with specific segment wavelength matching refractive index, wherein the composition is one that is formed of resin, a nanometer metal oxide or complex metal oxide having refractive index greater than or less than resin refractive index, and one or more additives added and dispersed in the resin to form a packaging material composition with specific wavelength segment matching refractive index.

The present invention relates to a packaging material composition with specific segment wavelength matching refractive index, wherein, based on a fluorescent agent that emits light wavelength 2 bandwidth, the composition uses a nanometer metal oxide or complex metal oxide having a size of specific D=λ/4n optic thickness to serve as an additive for improving refractive index for wavelength of fluorescent agent segment to thereby form a packaging material composition with specific fluorescent agent wavelength segment matching refractive index.

The present invention relates to a packaging material composition with specific segment wavelength matching refractive index, wherein the composition comprises nanometer particle additives for refractive index matching in at least two segments of fluorescent agent light segment wavelength and LED die light segment wavelength to thereby form a packaging material with specific white light wavelength multiple segment matching refractive index.

(b) DESCRIPTION OF THE PRIOR ART

A light-emitting diode (LED) is often packaged with a resin that has a refractive index of 1.4 to 1.5 that is quite different from the refractive index of the material of an LED die that is 2.5 to 3.5. This greatly reduces emission efficiency of light in the application of the LED. Currently, improvement is made by adjusting refractive index through (1) introduction of aromatic rings, (2) introduction of halogen element, (3) introduction of sulfur element, or (4) selection and addition of non-organic nanometer particles.

In respect of the addition of inorganic nanometer particles, it is known that a material of high refractive index can be formed by adding nanometer particles that contain a single transparent metal oxide, such as metal oxide of Ti, Zn, Mg, Nb, Sn, Zr, Ce, Ta, La, Hf, Si, Al, or In, in resin. On the other hand, it was also proposed to form a high refractive index layer by adding various complex metal oxides of multiple elements selected from the above listed metallic elements, including Ti, Zn, Mg, Nb, Sn, Zr, Ce, Ta, La, Hf, Si, Al, or In, such as complex metal oxides including complex oxides of titanium oxide-zirconium oxide-tin oxide and complex metal oxides of tin oxide-titanium oxide, in a resin. This is a known technology.

Regarding to the method of introducing organics into non-organics an example is copolymerization of non-organic oligomers and organics, in which the size of the non-organics is molecular grade and cannot be used for design of wavelength in a specific range. Potential improvement may be made. Further, a method that puts emphasis in nanometer particles being less than 20 nm is also available, wherein when the size of the nanometer particles is less than ¼ wavelength of visible light, and especially when the particle size is even times of ½ wavelength, as illustrated in FIG. 4, it becomes an ineffective layer, imposing less effect on light, so that a great amount must be added and a limitation is imposed on change of refractive index, making it impossible to reach optimum matching.

Another method is to add complex oxides of tin oxide-titanium oxide having a particle size of $1 \times 10^{-8}$ m in organic resin (the nanometer particles having a size less than λ/10), which applies the principle of Raleigh scattering and is similarly related to wavelength and particle radius, being in inverse proportion to wavelength to the fourth power and in proportion to radius of the nanometer particles to the fourth power. When the particle size is even times of ½ wavelength, an ineffective layer is formed, so that the amount of addition must be increased for smaller nanometer particles, and the relative viscosity coefficient is increased. This affects the flowability of resin and becomes adverse to the subsequent packaging operation and makes it impossible for providing a potential space of improvement for segmental wavelength matching.

In the prior art technology, the relationship between wavelength and nanometer particles is expressed as geometric thickness. For example, particle size of Rayleigh scattering is less than λ/10 and the size of nanometer particle of Mie scattering is greater than λ/10. The relationship between particle and wavelength is estimated and derived from the geometric thickness, making it impossible to precisely calculate an optimum size of the nanometer particle and neglecting the influence caused by medium material refractive index on the light passing therethrough and the mutual influence of light in different refractive indexes of different medium materials, omitting the optic thickness that truly affects optic path (D=λ/4n, which includes refractive index n that is a factor that influences the optic path) to adjust the wavelength within a specific range segment of wavelength and the relationship with respect to the optic thickness, these being not discussed at all and what being emphasized is the addition of small particle of nanometer metal oxides, comparison to the prior art technology being illustrated in FIG. 5.

SUMMARY OF THE INVENTION

An objective of the present invention is to provide a packaging material composition with specific segment wavelength matching refractive index, which is used to match the refractive index of a die of light-emitting diode (LED) to have all the light emitting from the LED entering air medium and thus increasing light emission efficiency. Further, since all the light is guided to emit outward and not accumulated in the LED, the generation of thermal energy is greatly reduced, and the need of an external heat dissipation mechanism is reduced so as to reduce the cost.

Another objective of the present invention is to provide a specific segment wavelength matching refractive index, using nanometer metal oxides or complex metal oxides as an additive for improving segment refractive index, the particle size $D=\lambda/4n$ optic thickness of the nanometer metal oxide forming the effective segment wavelength improving medium layer, serving as a segment wavelength matching refractive index optic characteristic additive material. Also, a resin is used as a bonding base material for bonding purpose of bonding nanometer metal oxides so as to make it a composite material composition to serve as a material composition of specific segment wavelength matching refractive index.

A further objective of the present invention is to provide a packaging material composition that matches the refractive index with fluorescent agent, so that the refractive index of the packaging material composition matches the fluorescent agent, allowing all the light emitting from the fluorescent agent to enter air medium.

Yet a further objective of the present invention is to provide a packaging material composition that matches an LED die and a fluorescent agent in respect of refractive index. The refractive index of the packaging material composition matches the LED die so that light emitting from the LED is all allowed to enter the fluorescent agent to take part in reaction, whereby the light emitting from the fluorescent agent is allowed to enter air medium.

Light-emitting diode (LED) has the following three advantages:

(a) Multiple color light source, wherein based on the difference of energy level of the material used, photon energy induces light of different segment wavelengths, this being the specific segment wavelength referred tin the present invention. (b) High light emission efficiency and low light retrieval efficiency. (c) the characteristic of lifespan being inversely proportional to heat. Further, waste heat generated by LED has always been a significant problem and thus various heat dissipation techniques have been developed, such as high thermal conductivity substrate, heat conductive glue, heat conductive paste, heat conductive pipe, and the likes. The present inventor is well aware that the source of waste heat is only absorbed by the material in a very small fraction for the major reason that the light retrieval efficiency is poor. The reasons that the light retrieval efficiency is poor are as follows:

(1) Transmittance loss of light (interface reflection caused by incidence angle being less than critical angle), and (2) Loss caused by total reflection of light (total internal reflection caused by incidence angle being greater than critical angle).

Consequently, the light emission efficiency of LED is approximately 20%, the remaining of light being constrained within the die forming a source of waste heat.

Further, LED light source is characterized by having a bandwidth of specific segment wavelength, containing specific element materials of III and V groups, and having specific material refractive index, so that a single refractive index packaging material does not meet the needs and may cause loss of internal reflection and total internal reflection.

In brief, the source that forms waste heat is primarily due to poor matching of refractive index for optic characteristics. The present invention employs optic characteristics as a solution to achieve the purpose of increasing light retrieval efficiency, a brief description being given as follows:

(1) When light travels from $n_2$ medium to enter $n_1$ medium with an incidence angle less than the critical angle, a fraction of the light is allowed to enter the $n_1$ medium due to reflection, but another fraction follows Fresnel Equations, optic loss= $[(n_2-n_1)/(n_2+n_1)]^2 \times 100\%$, and is reflected back to the $n_1$ medium, thereby affecting light emission efficiency. The present invention achieves matching of refractive index of the $n_2$ medium in order to reduce the loss of light passing through the $n_1$ medium, thereby increasing the light retrieval efficiency.

(2) When light travels from the $n_2$ medium into the $n_1$ medium with an incidence angle greater than the critical angle, due to the limitation of critical angle $\theta$ arcsin $(n_1/n_2)=\sin^{-1}(n_1/n_2)$, total internal reflection is induced. Based on the above equation, when the refractive index of the $n_1$ medium is larger, the critical angle $\theta$ is larger. According to the present invention, the fraction of light that is subject to total internal reflection is reduced to thereby effectively expand the critical angle for improving light retrieval efficiency.

(3) Reduction of percentage of in-situ reflection light: matching of refractive index packaging material composition forms nanometer particles and resin in crystalline interface, non-continuous film interface of different refractive indexes is similar to a roughened surface that helps scattering light and effectively reduce in-situ reflection of light to thereby increase the light retrieval efficiency.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 5 is comparison for difference between the present invention and the prior art techniques.

FIG. 6 shows refractive indexes of LED die and material.

FIG. 8 illustrates data of an example.

DETAILED DESCRIPTION OF THE PREFERRED EMBODIMENTS

Figure 1:
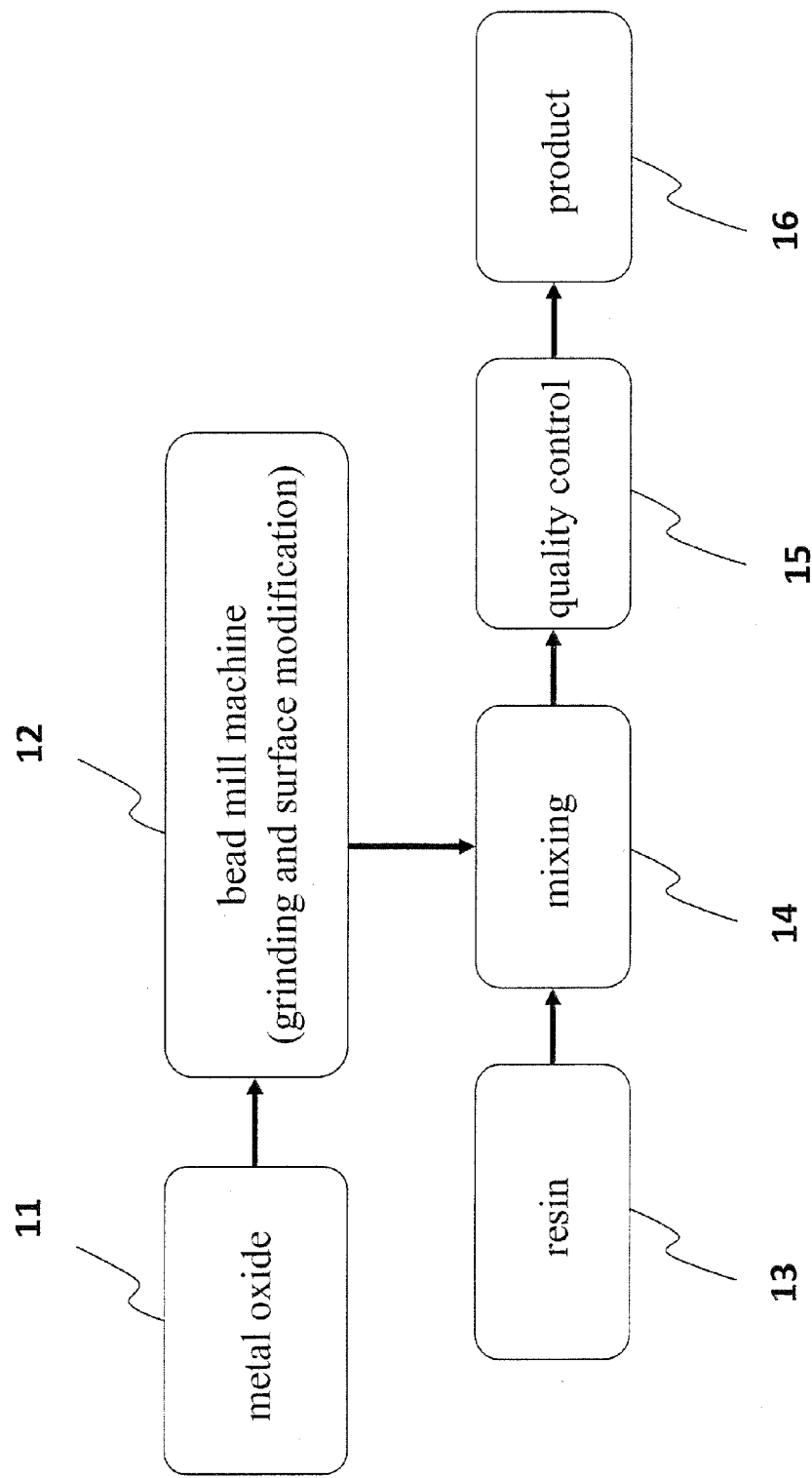
FIG. 1 is a flow chart of a manufacturing process

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The present invention provides a packaging material composition with specific segment wavelength matching refractive index. An embodiment is used to describe the present invention and is not to limit the scope of the appended claims.

A packaging material composition with specific segment wavelength matching refractivity according to an embodiment of the present invention has a representative formula that is indicated by composition of $[(Rn)_{(1-a)}+(Mna)_a]=RMvnx$, R: resin which can be one of epoxy resin, silicone resin, UREA, PMMA, PC, and PI or a composite thereof, n being refractive index of the resin material; M: a metal oxide of Ti, Zn, Mg, Nb, Sn, Zr, Ce, Ta, La, Hf, Si, Al, or In, or complex oxides such as complex oxides of titanium oxide-zirconium oxide-tin oxide and complex oxides of tin oxide-titanium oxide, na being the refractive index of the nanometer particle material.

The nanometer particle size of the above mentioned metal oxides or complex metal oxides uses segment particle size D as a predetermined value of nanometer particle size. D corresponds to LED light $\lambda$, and optic thickness of $D=\lambda/4n$ (n being the refractive index of the additive) as particle size is used as a reference for selecting a desired range of segment wavelength $\lambda$ for formation of an effective medium layer of segment wavelength; a and (1−a) are wt % or volume ratio of the two substances, and the amount of the additive is increased or decreased according to the desired refractive index; RM: a composition of R and M; nx: the refractive index of LED die material, vnx: the refractive index of RM composition, being a matching refractive index of the die material, the refractive index matching the LED die to allow all the light emitting from the LED to enter air medium, providing excellent light retrieval efficiency.

For example, in FIG. 6, a composition packaging resin is illustrated, wherein LED is made of GaP material with light $\lambda$ being 565 nm light source, refractive index being 3.42 (nx), resin being epoxy resin having a refractive index 1.51, additive being $ZrO_2$ having a refractive index of 2.0, $D=\lambda/4n=565/4\times2=70.6$ nm optic thickness particle size, forming particle distribution rang with peak being 70.6 nm, an optimized specific segment 565 nm $\lambda$ matching refractive index vnx=1.85; air $n_0$=1.

Figure 4:
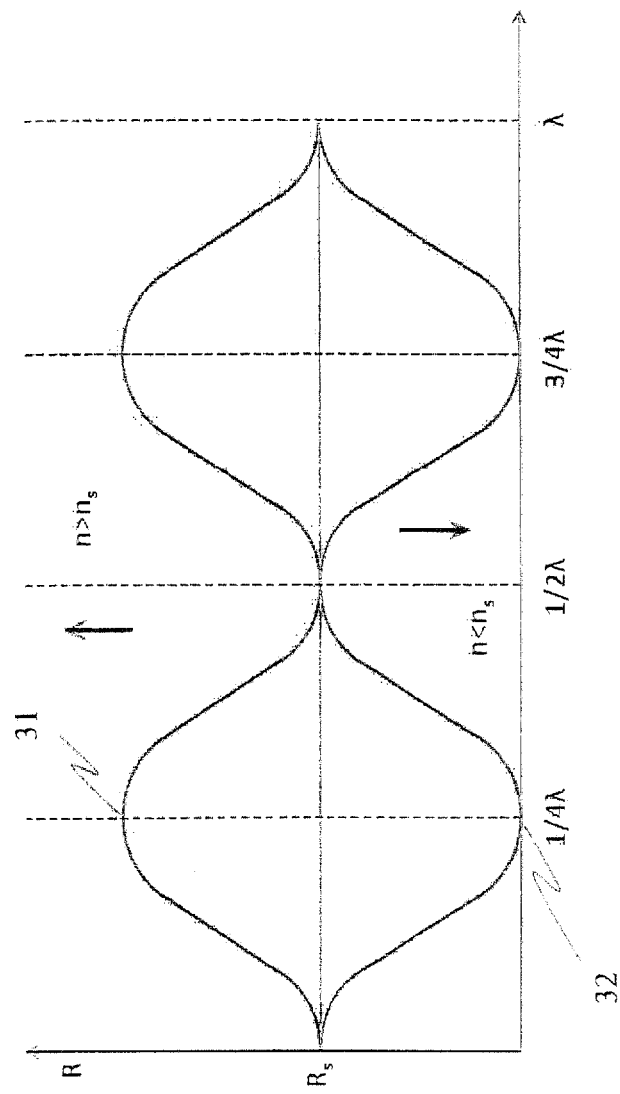
FIG. 4 illustrates optic thickness $D=\lambda/4n$ optic path.
Figure 7:
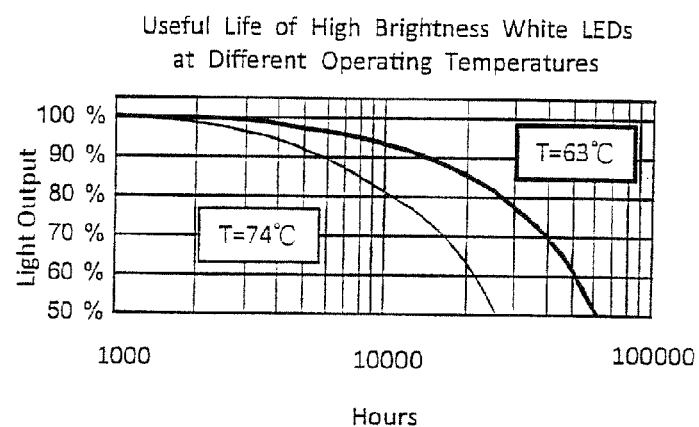
FIG. 7 illustrates relationship between LED temperature and lifespan.

Thus, when $nx>vn_x$, refractive index shows a minimum, and when $vnx>n_0$, refractive index shows a minimum, thereby being advantageous for light to transmit from nx to $vn_x$ and then to $n_0$ air, as shown in FIG. 4. According to Fresnel Equations, light traveling from nx (21) into vnx (24) medium shows an optic reflection loss of 8.9%; light traveling from $n_0$ medium air into vnx (24) shows an optic reflection loss of 8.8%; light goes from low refractive index into high refractive index makes a 180-degree conversion of phase so that the symbol is reversed, making it possible to counterbalance each other to finally result in an optic reflection loss of only 0.1%. Thus, light emitting from the light-emitting diode (LED) and penetrating into air medium shows an increased amount, so that vnx is the matching refractive index according to the present invention and is the refractive index of the composition of the composition packaging material.

In summary, the embodiment of the present invention considers the following four characteristics of light-emitting diode:

(1) Single beam light source: light wavelength of LED die is within a specific segment, so that it only needs functionality matching realized in specific segment wavelength, making it easy to manufacture with low cost.

(2) Die material having specific refractive index: LED is a composition of specific element materials of III and V groups and thus has a corresponding refractivity, and a packaging material does not get better with increased refractivity and optimization is only realized with matching refractive index.

(3) Matching of refractive index for light wavelength $\lambda$ segment range of LED: the bandwidths of light wavelength of LED in different segments and the corresponding different die materials induce difference of refractive index, requiring matching refractive index in different wavelength segment bandwidth ranges.

(4) Optic path specificity of nanometer particle optic thickness: the best influence of the particle size of nanometer particle additive on light is at the optic path corresponding to $\frac{1}{4}\lambda$ optic thickness, not simply the smaller the better or the greater the better.

As such, the packaging material composition with specific segment wavelength matching refractivity according to the embodiment of the present invention has the following advantages:

(1) Specific segment wavelength: light $\lambda$ of LED and fluorescent agent are within the range of single-color light beam segment range and cover only a small segment of the complete light spectrum, this being referred to specific segment wavelength according to the present invention.

(2) Matching refractive index: based on the refractive index $n_x$ of LED die material, it obtains a refractive index having a value approximately $vn_x$, which serves as the matching refractive index.

(3) Segment nanometer additive: the additive is nanometer particles of metal oxides, of which the particle size is obtained with segment wavelength $\frac{1}{4}\lambda$ optic thickness as calculation basis, $D=\lambda/4n$, to serve as a reference for selecting the particle size of the nanometer particles for adjusting the segment matching refractive index.

(4) Multiple segment matching: fluorescent agent is excited to give off light and is thus equivalent to a light source, which also requires a specific segment wavelength matching refractive index packaging material to increase light retrieval efficiency. Both LED and fluorescent agent individually occupy a small segment of the light spectrum, so that the selection of particle size of the additive provides diverse multiple segments so as to realize one or multiple segment matching.

(5) Packaging material composition: resin is used as a base material of bonding agent that is added with nanometer metal oxide additive for improving segment refractive index to form the packaging material composition with specific segment wavelength matching refractivity according to the present invention.

The embodiment of the present invention treats a fluorescent agent that is excited to give off light as a light source. Light emitting from the fluorescent agent passes through media of different refractive indexes and is also subjected to reflection, refraction, and total internal reflection. To increase light retrieval efficiency of the fluorescent agent, the matching refractivity material composition according to the present invention is used, giving composition of $[(Rn)_{(1-a)}+(Mna)_a]=RMvnx$ as a representative formula to describe as follows: taking light wavelength $\lambda a$ of the fluorescent agent as a segment, nanometer metal oxides Mna with D particle size are added, the fluorescent agent having a material refractive index of nx, thereby forming a RMvnx matching refractivity material composition, so that the light emission of excitation of the fluorescent agent can be easily guided out. The fluorescent agent comprises a fluorescent agent of complex metal oxides or complex metal nitrides or complex metal sulfides, such as: one or more complex material of YAG:Ce$^+$; YAG:Td$^+$; YAG-Nd$^+$; YAG-TAG; SrGa$_2$S$_4$:Eu$^+$; Sr$_2$Si$_5$N$_8$:Eu$^+$; SrS:Eu$^+$; SrGa$_2$S$_4$:Eu$^+$; Ba$_3$Si$_6$O$_{12}$N$_2$:Eu$^+$; CaAlSiN$_3$:Eu$^+$ ZnSe, to increase the light retrieval efficiency.

Figure 3:
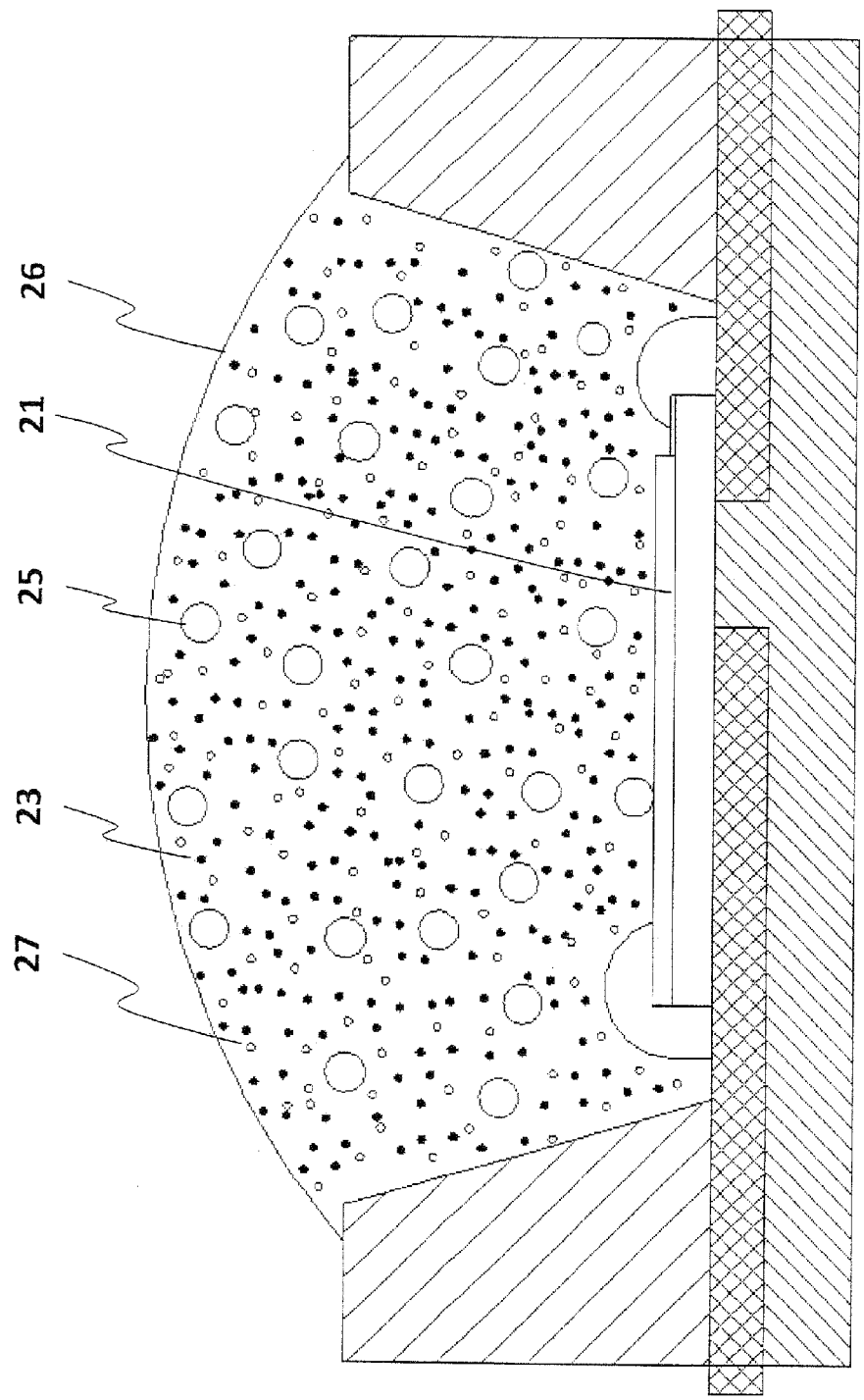
FIG. 3 is a schematic view illustrating packaging of specific multiple segment wavelength white light LED.
Figure 11:
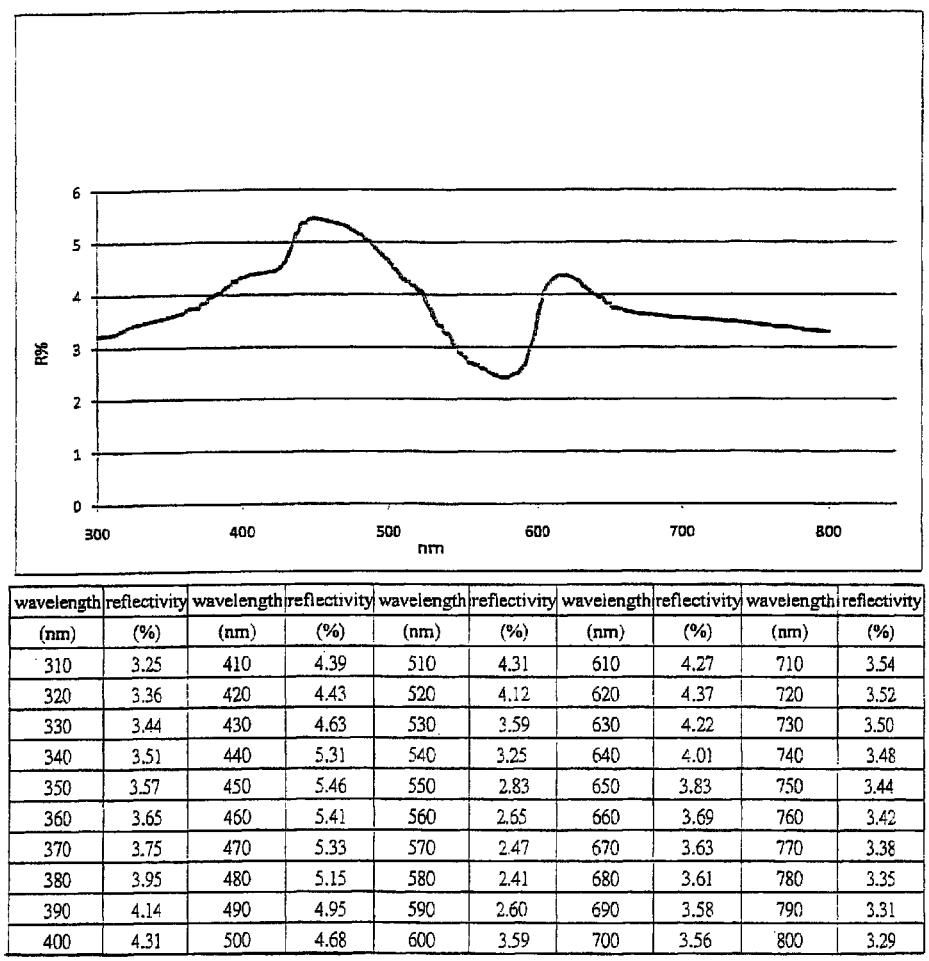
FIG. 11 is reflectivity of white light packaging composition.

The composition according to the embodiment of the present invention may comprise at least two different segment wavelengths, matching refractive index packaging materials as shown in FIG. 11. The segment wavelength has two Xs, one being blue light emitting from die showing wavelength λ=472 nm; the other being light emitting from the fluorescent agent 25 showing wavelength λa=574 nm Thus, two D particle sizes are added, as shown in FIG. 3, one being segment matching die 23, the other being segment matching fluorescent agent 27. The two nanometer particle size additives form two segment wavelength matching packaging material compositions 26. When the die emits light wavelength λ, 472 nm that is complementary color to light wavelength λa 574 nm of YAG:Ce+ fluorescent agent 25, a user may perceive white light when it is lit, as shown in FIG. 3. RM√nx: the composition referred to in the present invention. The best matching refractive index segment wavelength corresponds to the refractive index of the LED material. The refractive index segment can match wavelength λ=472 nm of the LED die, making all the light emitting from the LED entering the fluorescent agent to participate in the reaction. Another best segment corresponds to the position where the fluorescent agent gives of light wavelength λa=574 nm, so that the refractive index can be of segment matching with the light of the fluorescent agent, making all the light excited from the fluorescent agent guided out to air. Blue light+yellow light are complementary to each other to form white light of excellent light retrieval efficiency. The RM composition may be added with red and green fluorescent agents. The refractive index can be of light segment matching with the red and green fluorescent agents so that all the light excited from the fluorescent agents can be guided out to air to form white light of red, green, blue colors with excellent light retrieval efficiency. The RM composition may also be added with three fluorescent agents of red, green, and blue and the refractive index can be of light segment matching with the red, green, and blue fluorescent agents, so that all the light excited from the fluorescent agents can be guided out to air to form white light of red, green, blue colors with excellent light retrieval efficiency, to thereby provide multiple segment matching refractivity packaging material composition for white light.

The particle size of complex metal oxides added is within the range of nanometer particles having 0.01%-8% wt particle size distribution with peak being approximately equal to λ/4n optic thickness with respect to the light wavelength emitting from LED or fluorescent agent to serve as a segment wavelength refractivity adjusting additive.

The present invention adds nanometer particles having a size of specific segment die light wavelength λ particle size D=λ/4n. Wet bead mill machine can be used for machining and the product is inspected with particle size analyzer of which peak≈D, which the particle size corresponding to wavelength optic thickness referred to in the present invention. The particles are added in resin 1-4 to form composition 1-6, serving as specific segment wavelength λ matching refractive index additive. In other words, particle size D must be equal to odd times of ¼ wavelength λ optic thickness and the refractive index become the maximum or the minimum as shown in FIG. 4. When particle size D is equal to even times of ½ wavelength λ optic thickness, it returns to initial point and is referred to as ineffective layer as shown in FIG. 4.

When nanometer particle refractive index is greater than resin, the maximum generated may increase reflectivity 31. When nanometer particle refractive index is less than resin, the minimum generated may increase transmittance 32, and thus being advantageous for easiness of completing matching refractive index.

Figure 12:
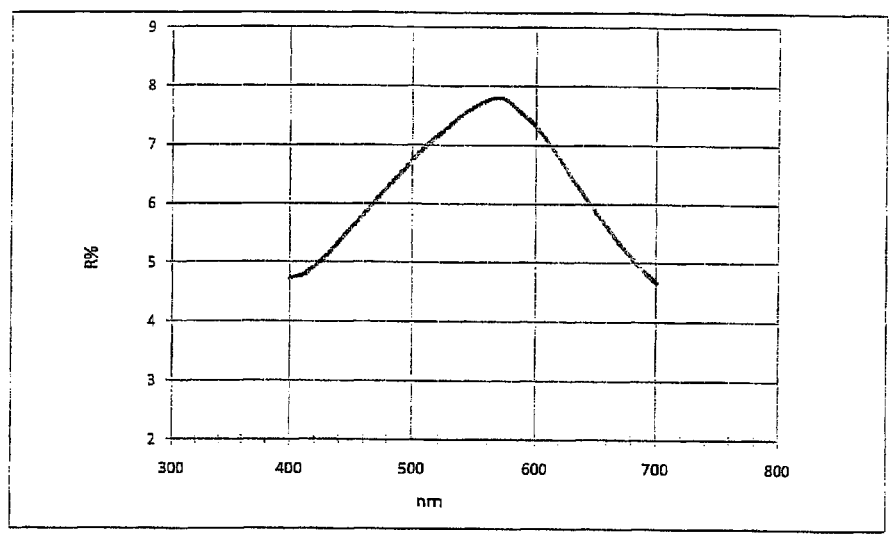
FIG. 12 illustrates segment reflectivity.

Also, referring to FIG. 6, a composition packaging resin is provided, wherein GaP die material 21, which emits λ565 nm light as segment wavelength, refractive index being n$_x$=3.44; resin used being epoxy resin having refractive index 1.51, additive being ZrO$_2$ having refractive index 2.0, D=λ/4n=565/4×2=70.6 nm, particle distribution range being of peak at 70.6 nm. According to refractivity equation n=c/υ; c being light speed in vacuum, n being the refractive index of medium and υ being light speed in the medium, they being inversely proportional to each other. When LED gives off single beam wavelength λ incident upon a high refractive index medium (optic thickness D), the speed is slowed down. The more times light transmits through high refractive index medium nanometer particles in the optic path, the slower the speed will be. Due to n=c/υ, slower speed induces higher refractive index. Characteristic analysis and computation of optic thickness generally adopts matrix method of characteristic admittance. This method constitutes the base of computation and design of optic thickness. The present invention also employs derivation of Fresnel Equations to calculate the refractive index corresponding to wavelength, as shown in FIG. 12, reflectivity at 470 nm being 7.8%, amount absorbed by epoxy resin and ZrO$_2$ being extremely small and being omitted, so that it is calculated that segment refractive index of wavelength 470 nm is 1.78.

When the refractive index of nanometer particles is greater than resin, the more the added amount a (wt %) is, the higher the refractive index is. By increasing the refractive index to vnx, the refractive index for the optimum matching wavelength is formed. When the refractive index of nanometer particles is less than resin, the more the added amount a (wt %) of nanometer particle is, the lower the refractive index is. Thus, easiness of processing of the matching refractive index composition is realized.

Nanometer particles are determined according to die light wavelength λ/4n segment wavelength, such as 750-1050 nm IR light; 620-750 nm red light; 592-620 nm orange light; 578-592 nm yellow light; 513-578 nm green light; 500-513 nm bluish green light; 464-500 nm blue light; 446-464 nm deep blue light; 446-400 nm purple light; 360-400 nm UV light and the likes, in order to correspond to ¼λ wavelength of light, and divided by the refractive index of nanometer particle material to obtain optic thickness particle size to serve as corresponding segment wavelength additive, the segment matching refractive index composition so obtained being used as packaging material for LED matching refractivity of IR light, red light, orange light, yellow light, green light, bluish green light, blue light, deep blue light, purple light, UV light, and the likes.

Similarly, matching packaging material resin may be added with two fluorescent agent materials of red (R) and green (G), using 400-490 nm LED as light source die material matching metal oxides Mna of optic thickness D, and two corresponding fluorescent agents of R and G, matching two fluorescent wavelengths λ$_a$, metal oxides Mna of optic thickness D to form specific wavelength multiple segment matching refractive index composition to serve as specific white light wavelength matching refractive index packaging material composition. Similarly, a 360-400 nm ultraviolet (UV) LED can be used as a light source, added with metal oxides Mna of light source die material matching optic thickness D, and three corresponding fluorescent agents of R, G, B (blue) wavelengths λa, matching metal oxides Mna of optic thickness D to form multiple wavelength segment matching refractive index composition, to serve as specific segment white light matching refractive index packaging material composition for three primary colors R, G, B.

Further, inorganic fluorescent agent can be one or more than one mixed of YAG:Ce$^+$, YAG:Td$^+$, YAG-Nd$^+$, YAG-TAG, SrGa$_2$S$_4$:Eu$^+$, Sr$_2$Si$_5$N$_8$:Eu$^+$, SrS:Eu$^+$, SrGa$_2$S$_4$:Eu$^+$, Ba$_3$Si$_6$O$_{12}$N$_2$:Eu$^+$, CaAlSiN$_3$:Eu$^+$, and using light wavelength of the fluorescent agent as segment to add in the resin nanometer particles corresponding to the wavelength particle sizes, and then adding fluorescent agent to serve as a specific fluorescent segment matching refractive index material composition.

Further, the LED wide blue light specific multiple segment wavelength, light source being between 400-490 nm, and including a yellow fluorescent agent wavelength segment; or including two wavelengths of green and red; or including three wavelength fluorescent agent segments of red, green, and blue, the resin being added with a composition having multiple segments corresponding to each of the wavelength nanometer particles, to match wide blue multiple segment refractive index to serve as packaging material composition of specific multiple segment white light wavelength matching refractive index.

The specific multiple segment wavelength of LED is within 360-400 nm and include multiple fluorescent agent wavelength segments if red, green, and blue. The resin is added with a composition having multiple segments corresponding to nanometer particles of each wavelength to match ultraviolet light multiple segment refractive index to serve as packaging material composition of specific multiple segment white light wavelength matching refractive index.

A packaging material composition with specific segment matching refractive index has the following advantages:

(1) Increasing light retrieval efficiency: matching refractive index material forms a light increasing transmittance layer to allow light of LED to be easily guided out to air and increase light emission lumen of LED.

(2) Easy manufacturing: the light of LED is basically referred to as a single beam and it is easy to calculate nanometer particles corresponding to the size of segment wavelength $D=\lambda/(4\times n)$ optic thickness to form effective medium layer corresponding to λ, and the added amount of nanometer particles can be used to obtain the optimum segment matching refractive index, making mass production easy.

(3) Reducing expansion coefficient: resin has an expansion coefficient that is greater than LED die, and inorganic metal oxides have expansion coefficients that are often less than resin. Thus, adding high refractive index metal oxides helps reducing expansion coefficient and also helps maintaining size stability.

(4) Reducing generation of waste heat: the absorption coefficient of LED material is usually less than 10% and light retrieval efficiency is 20%. The remaining 70% of useful light is converted into useless waste heat. Thus, increasing light retrieval efficiency would lead to reduction of waste heat, so that the needs for heat dissipation mechanism after packaging are reduced, and correspondingly, the cost of use is reduced.

(5) Increasing lifespan of LED: with improved light emission efficiency of LED, temperature is correspondingly reduced. The lower the operation temperature of LED is, the longer the lifespan of LED is, as shown in FIG. 6, and correspondingly, the cost for replacement of light source is reduced.

(6) White light manufacturing process efficiency of LED being good: the refractive index can match LED die so that light emitting from LED can all enter fluorescent agent to take part in reaction and the fluorescence efficiency is high. The refractive index can match fluorescent light wavelength λa, making fluorescent light retrieval efficiency good.

Two examples are given below to allow those having ordinary skills in the art to readily understand the present invention:

Example 1

Packaging material composition with segment matching refractive index is described as follows:

Based on the composition representative formula $[(Rn)_{(1-a)}+(Mna)_a]=RMvnx$, wherein Rn: bisphenol type epoxy resin having refractive index 1.51, Mna: ZrO$_2$, the refractive index being 2.0, particle size distribution peak being at Peak=55.65 nm, a: 1.25 wt %, 1−a:=98.75 wt %. Embodying steps are according to the flow chart of FIG. 1, as follows:

(1) degussa ZrO$_2$ initial material 1-1 is put in bead mill machine 1-2 with ethyl acetate as surfactant and MEK (Methyl Ethyl Ketone) as solvent for grinding processing and inspected with particle size distribution instrument to obtain nanometer particles that are distributed with particle size peak 55.65 nm as center.

(2) Preparing epoxy resin (13) 98.75 wt % and 55.65 nm ZrO$_2$ 1.25 wt %, which are put into a mixer 14 for mixing and dispersing operation.

Figure 9:
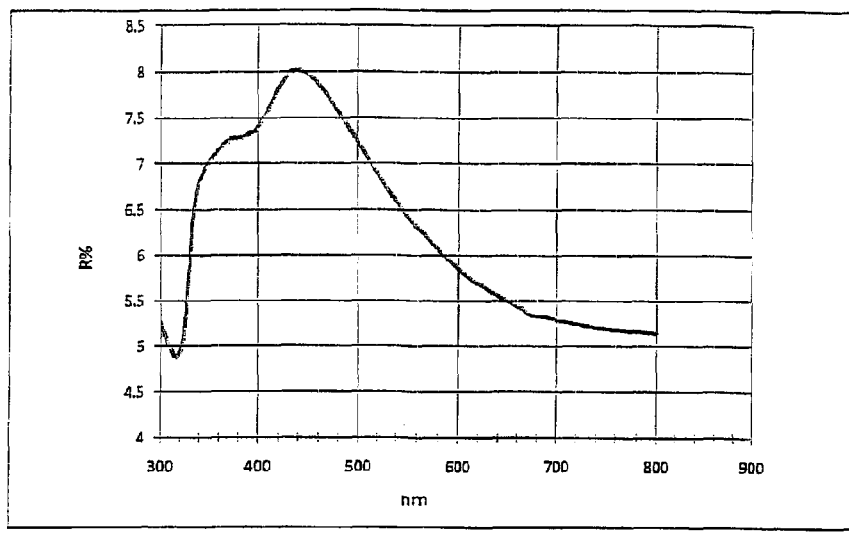
FIG. 9 is reflectivity of packaging composition.

(3) Taking a sample for curing to form 2×6×30 mm, inspecting reflectivity, FIG. 9, 450 nm refractive index 15, to provide predetermined value of FIG. 8, Example 1 being a final product 16.

Figure 2:
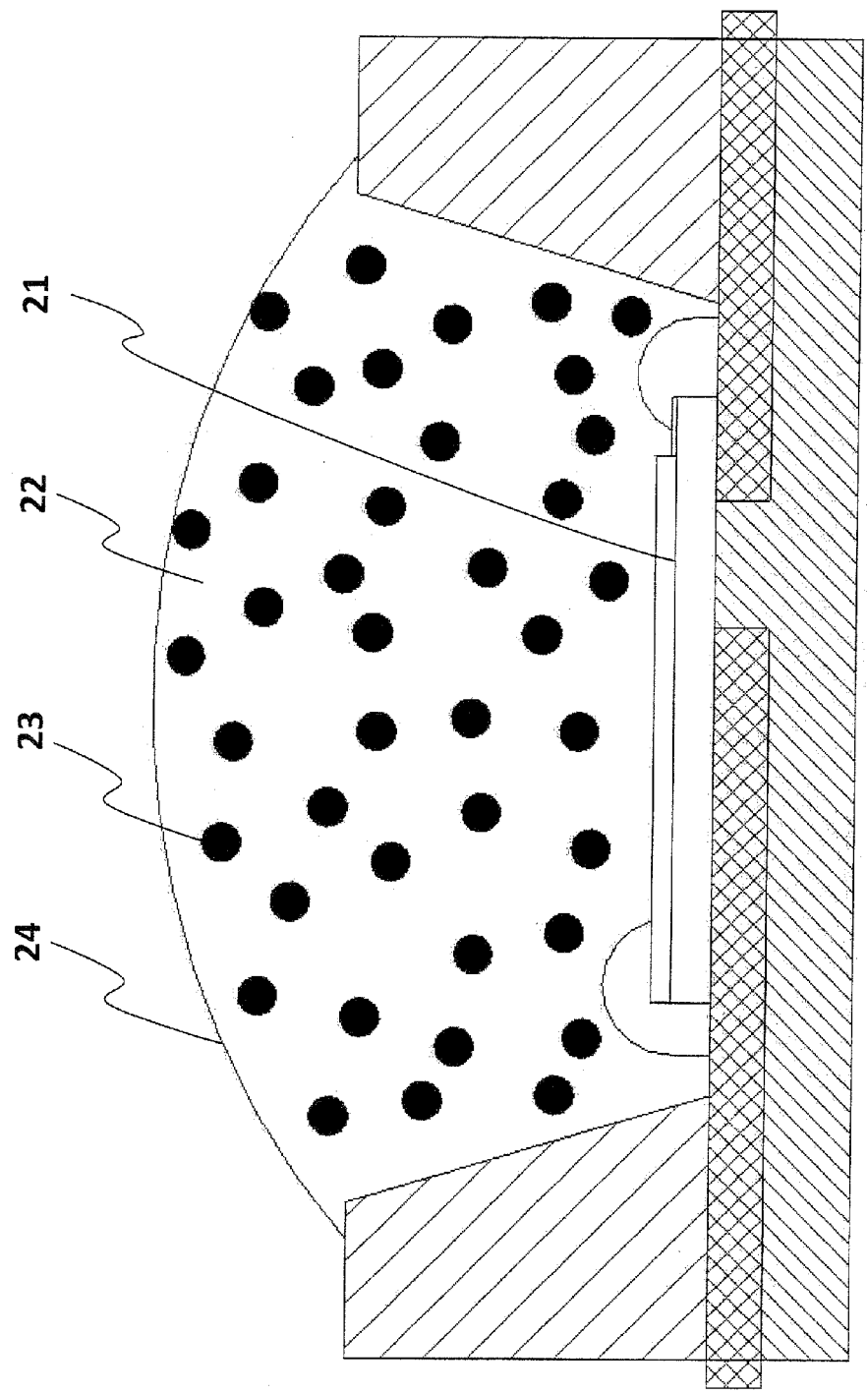
FIG. 2 is a schematic view illustrating packaging of specific segment wavelength LED.

The numeral example provides a composition, of which particle size distribution center is 55.65 nm, as shown in FIG. 9, approximately close to the setting value, peak≈D=λ/4n, so that λ=4Dn=4×55.65×2=445.2 nm is within tolerable error with respect to reflectivity peak 450 nm of FIG. 9. In FIG. 9, measured value of 450 nm reflectivity is 5.3%, and according to Fresnel Equation, optic loss=$[(n_2-n_1)/(n_2+n_1)]^2 \times 100\%$, and thus, $[(n_2-1)/(n_2+1)]^2 \times 100\%=5.3\%$, the refractive index $n_2=1.6$=vnx. Taking LED blue light wavelength λ=450 nm, the refractive index nx of material is 2.6, and proceeding with the specific segment wavelength matching refractive index packaging shown in FIG. 2. Epoxy resin packaging is performed under the same comparison basis to compare light retrieval efficiency, the specific segment matching refractive index package according to the present invention being 15.35 lumen, while the prior art epoxy resin packaging being 12.88 lumen. Thus, the specific segment wavelength matching refractive index package has an optic flux gain being 19.2% (equation: (15.35−12.88)÷12.88×100%=19.2%), namely light retrieval efficiency being increased by 19.2%.

Example 2

Multiple segment wavelength packaging material composition is described as follows:

Representative composition formula $[(Rn)_{(1-a)}+(Mna)_a]=RMvnx$, initial material: Rn resin composite, comprising epoxy resin 90.25 wt % that contains YAG-Ce$^+$ fluorescent agent 8 wt %, Mna: 55.65 nm ZrO$_2$ additive 1.25 wt %; 97.6 nm SiO$_2$ additive 0.5 wt %. Embodying steps are as FIG. 1:

(1) degussa ZrO$_2$ initial material 11 is put in bead mill machine 12 with ethyl acetate as surfactant and MEK (Methyl Ethyl Ketone) as solvent for grinding processing and inspected with particle size distribution instrument to obtain nanometer particles that are distributed with particle size peak 55.65 nm as center, this being prepared for subsequent use.

(2) repeating the above step to use bead mill machine 12 to grind $SiO_2$, inspected with particle size distribution instrument to obtain nanometer particles that are distributed with particle size peak 97.6 nm as center, this being prepared for subsequent use.

(3) preparing epoxy resin (13) 90.25 wt %; 55.65 nm $ZrO_2$ 1.25 wt %, and 97.6 nm $SiO_2$ 0.5 wt %, which are put into a mixer 14 for mixing and dispersing operation.

(4) taking a sample for curing to form 2×6×30 mm, inspecting reflectivity and 450 nm refractive index 15, to provide predetermined value of FIG. 8, Example 2, being a final product 16, reflectivity spectrum being FIG. 11.

(5) adding YAG 8 wt % in the semi-finished product of step (3) and positioned in mixer for mixing and dispersing operation to provide a final product 16, specific white light multiple segment matching packaging material composition. (It is noted that fluorescent agent material must be added and mixed after QC of the matched packaging material.)

Figure 10:
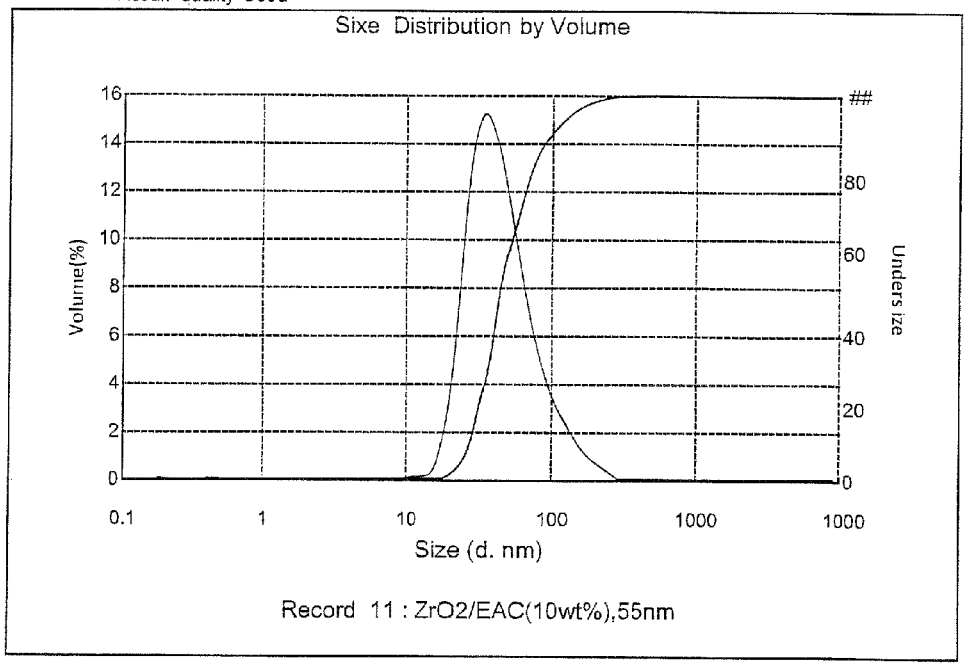
FIG. 10 illustrates distribution of nanometer particle size.

Example 2 provides a composition, which corresponds to LED wavelength $\lambda=450$ nm and refractive index being 2.6, fluorescent agent $\lambda_a=570$ nm refractive index 1.82. Used to package two segment the refractive index, requiring matching refractive index v2.6=1.61 and matching refractive index v1.82=1.35, as shown in FIG. 10. As such, the following advantages are provided:

(1) Increasing fluorescent agent efficiency: since segment wavelength $\lambda=450$ nm matches LED light emitter die material, according to refractivity theorem, v2.6=1.61, the refractive index matching LED die so that light emitting from LED can all enter the fluorescent powder to participate reaction and thus fluorescent agent efficiency is high.

(2) Excellent light emission efficiency: since segment wavelength $\lambda_a$ 570 nm fluorescent agent refractive index matching v1.82=1.35, the reflectivity of the light excited from the fluorescent agent is low and is easy to be guided out into air medium, so that internal reflection of light back into the fluorescent agent is reduced to provide excellent light emission efficiency.

(3) Mixing color to form extremely homogenous white light: since wavelength $\lambda=450$ nm and wavelength $\lambda_a=570$ nm fluorescence are complementary to each other and since light, when traveling between nanometer particles, is subjected to scattering to provide a result of expansion, color can be mixed to form extremely homogenous white light, as shown in FIG. 3.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A packaging material composition with specific segment wavelength matching refractive index, the packaging material composition using light source wavelength of a light-emitting diode (LED) or a fluorescent agent as a segment range, comprising:

an additive, which comprises nanometer metal oxides or complex metal oxide nanometer particles, wherein the additive segment particle size is odd times of one quarter (¼) of a light source wavelength, divided by refractive index of the additive to obtain an optic thickness particle size range (D=λ/(4×n), in which D is segment particle size, λ is light source wavelength, and n is the refractive index of the additive); and a bonding agent, which is a resin material; the bonding agent being mixed with the additive particles having the additive segment particle size to form a packaging material composition that exhibits specific segment matching refractive index matching the segment range of the LED or fluorescent agent in order to improve light retrieval efficiency.

2. The packaging material composition with specific segment wavelength matching refractive index according to claim 1, wherein the segment refractive index additive, based on D=λ/4n optic thickness particle size as the segment range, is one or more than one particle size of different segments to be simultaneously added to form one or more than one wavelength multiple segment additives.

3. The packaging material composition with specific segment wavelength matching refractive index according to claim 2, wherein metal oxides are metal oxides nanometer particles of Ti, Zn, Al, Mg, Nb, Sn, Zr, Ce, Ta, La, Hf, Si, or In, which is added to correspond to the distribution of the wavelength particle size, approximately corresponding to odd times of ¼ wavelength optic thickness range.

4. The packaging material composition with specific segment wavelength matching refractive index according to claim 3, wherein the metal oxide particle size corresponds to the optic thickness of the wavelength of the light emitting from the LED or the fluorescent agent, added amount being in 0.01%-8% wt particle size distribution with peak being approximately equal to λ/4n optic thickness with respect to the light wavelength emitting from LED or the fluorescent agent to serve as a segment wavelength refractive index adjusting additive.

5. The packaging material composition with specific segment wavelength matching refractive index according to claim 2, wherein the segment range includes a specific multiple segment wavelength of the LED that is between 360-490 nm and includes red, green, blue, or multiple fluorescent agent wavelength segments, the resin being added with a composition of the nanometer particles having multiple segments corresponding to the wavelengths, and matching ultraviolet light multiple segment refractive index to serve as the packaging material composition of specific multiple segment white light wavelength matching refractive index.

6. The packaging material composition with specific segment wavelength matching refractive index according to claim 2, wherein the segment range includes a wide blue light specific multiple segment wavelength of the LED that is between 400-490 nm and includes a yellow fluorescent agent wavelength segment, the resin being added with the nanometer particles having multiple segments corresponding to the wavelengths, and matching wide blue light multiple segment refractive index to serve as a packaging material composition of specific multiple segment white light wavelength matching refractive index.

7. The packaging material composition with specific segment wavelength matching refractive index according to claim 2, wherein the segment range includes a wide blue light specific segment wavelength of the LED that is between 400-490 nm and includes green and red fluorescent agent wavelength segment, the resin being added with the nanometer particles having multiple segments corresponding to the wavelengths, and matching wide blue light multiple segment refractive index to serve as a packaging material composition of specific multiple segment white light wavelength matching refractive index.

8. The packaging material composition with specific segment wavelength matching refractive index according to claim 2, wherein the segment range includes a wide blue light specific segment wavelength of the LED that is between 400-490 nm and includes blue, green and red fluorescent agent wavelength segment, the resin being added with the nanometer particles having multiple segments corresponding to the wavelengths, and matching wide blue light multiple segment refractive index to serve as a packaging material composition of specific multiple segment white light wavelength matching refractive index.

9. The packaging material composition with specific segment wavelength matching refractive index according to claim 1, wherein the resin material comprises epoxy resin, silicone resin, UREA, PMMA, PC, PI, or a composite material thereof to serve as a bonding agent for the nanometer particles.

10. The packaging material composition with specific segment wavelength matching refractive index according to claim 1, wherein the complex metal oxides are nanometer particles of Ti, Zn, Mg, Al, Nb, Sn, Zr, Ce, Ta, La, Hf, Si, Al, In or a complex metal oxide composed of at least two of them, which is added to correspond to the distribution of the wavelength particle size, approximately corresponding to odd times of ¼ wavelength optic thickness complex metal oxide segment to serve as segment matching refractive index additive.

11. The packaging material composition with specific segment wavelength matching refractive index according to claim 10, wherein the particle size of the complex metal oxide segment corresponds to the optic thickness of the wavelength of the light emitting from the LED or the fluorescent agent, added amount being in 0.01%-8% wt particle size distribution with peak being approximately equal to λ/4n optic thickness with respect to the light wavelength emitting from LED or the fluorescent agent to serve as a segment wavelength refractive index adjusting additive.

12. The packaging material composition with specific segment wavelength matching refractive index according to claim 10, wherein the material composition matching specific fluorescent agent segment refractive index comprises LED and fluorescent agent light wavelengths as segments, added with nanometer particles having particle size corresponding to each wavelength to serve as a material composition of multiple segment simultaneous matching refractive index that match specific fluorescence and LED wavelengths.

13. The packaging material composition with specific segment wavelength matching refractive index according to claim 12, wherein the fluorescent agent is inorganic and is one or more than one mixed of YAG:Ce$^+$, YAG:Td$^+$, YAG-Nd$^+$, YAG-TAG, SrGa$_2$S$_4$:Eu$^+$, Sr$_2$Si$_5$N$_8$:Eu$^+$, SrS:Eu$^+$, SrGa$_2$S$_4$:Eu$^+$, Ba$_3$Si$_6$O$_{12}$N$_2$:Eu$^+$, CaAlSiN$_3$:Eu$^+$, and using light wavelength of the fluorescent agent as segment to add in the resin nanometer particles corresponding to the wavelength particle sizes, and then adding fluorescent agent to serve as a specific fluorescent segment matching refractive index material composition.

14. The packaging material composition with specific segment wavelength matching refractive index according to claim 1, wherein infrared (IR) specific segment wavelength of the LED is between 750-1050 nm, the resin being added with the nanometer particles corresponding to the wavelength segment in order to match IR segment refractive index to serve as a specific IR segment matching refractive index material composition.

15. The packaging material composition with specific segment wavelength matching refractive index according to claim 1, wherein red light specific segment wavelength of the LED is between 620-750 nm, the resin being added with the nanometer particles corresponding to the wavelength segment in order to match red light segment refractive index to serve as the specific red light segment matching refractive index material composition.

16. The packaging material composition with specific segment wavelength matching refractive index according to claim 1, wherein orange light specific segment wavelength of the LED is between 592-620 nm, the resin being added with the nanometer particles corresponding to the wavelength segment in order to match orange light segment refractive index to serve as the specific orange light segment matching refractive index material composition.

17. The packaging material composition with specific segment wavelength matching refractive index according to claim 1, wherein yellow light specific segment wavelength of the LED is between 578-592 nm, the resin being added with the nanometer particles corresponding to the wavelength segment in order to match yellow light segment refractive index to serve as the specific yellow light segment matching refractive index material composition.

18. The packaging material composition with specific segment wavelength matching refractive index according to claim 1, wherein green light specific segment wavelength of the LED is between 513-578 nm, the resin being added with the nanometer particles corresponding to the wavelength segment in order to match green light segment refractive index to serve as the specific green light segment matching refractive index material composition.

19. The packaging material composition with specific segment wavelength matching refractive index according to claim 1, wherein bluish green light specific segment wavelength of the LED is between 500-513 nm, the resin being added with the nanometer particles corresponding to the wavelength segment in order to match bluish green light segment refractive index to serve as the specific bluish green light segment matching refractive index material composition.

20. The packaging material composition with specific segment wavelength matching refractive index according to claim 1, wherein blue light specific segment wavelength of the LED is between 464-500 nm, the resin being added with the nanometer particles corresponding to the wavelength segment in order to match blue light segment refractive index to serve as the specific blue light segment matching refractive index material composition.

21. The packaging material composition with specific segment wavelength matching refractive index according to claim 1, wherein deep blue light specific segment wavelength of the LED is between 446-464 nm, the resin being added with the nanometer particles corresponding to the wavelength segment in order to match deep blue light segment refractive index to serve as the specific deep blue light segment matching refractive index material composition.

22. The packaging material composition with specific segment wavelength matching refractive index according to claim 1, wherein purple light specific segment wavelength of the LED is between 400-446 nm, the resin being added with the nanometer particles corresponding to the wavelength segment in order to match purple light segment refractive index to serve as the specific purple light segment matching refractive index material composition.

23. The packaging material composition with specific segment wavelength matching refractive index according to claim 1, wherein ultraviolet light specific segment wavelength of the LED is between 360-400 nm, the resin being added with the nanometer particles corresponding to the wavelength segment in order to match ultraviolet light segment refractive index to serve as the specific ultraviolet light segment matching refractive index material composition.

* * * * *